United States Patent
Webster

(10) Patent No.: US 10,681,295 B2
(45) Date of Patent: Jun. 9, 2020

(54) TIME OF FLIGHT CAMERA WITH PHOTON CORRELATION SUCCESSIVE APPROXIMATION

(71) Applicant: OmniVision Technologies, Inc., Santa Clara, CA (US)

(72) Inventor: Eric A. G. Webster, Mountain View, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 292 days.

(21) Appl. No.: 15/798,067

(22) Filed: Oct. 30, 2017

(65) Prior Publication Data

US 2019/0132537 A1     May 2, 2019

(51) Int. Cl.
*H04N 5/378*     (2011.01)
*G01S 17/10*     (2020.01)
(Continued)

(52) U.S. Cl.
CPC .......... *H04N 5/378* (2013.01); *G01S 7/4865* (2013.01); *G01S 17/10* (2013.01); *G01S 17/89* (2013.01); *H04N 5/3696* (2013.01); *G06T 7/521* (2017.01)

(58) Field of Classification Search
CPC ................................ H04N 5/378; G01S 17/10
See application file for complete search history.

(56) References Cited

U.S. PATENT DOCUMENTS

| | | |
|---|---|---|
| 8,642,938 B2 | 2/2014 | Bikumandla et al. |
| 9,523,765 B2 | 12/2016 | Sun et al. |
| (Continued) | | |

OTHER PUBLICATIONS

Perenzoni et al., "A 64x64-Pixels Digital Silicon Photomultiplier Direct TOF Sensor With 100-MPhotons/s/Pixel Background Rejection and Imaging/Altimeter Mode With 0.14% Precision Up to 6 km for Spacecraft Navigation and Landing," IEEE Journal of Solid-State Circuits, vol. 52, No. 1, Jan. 2017, 10 pages.

(Continued)

*Primary Examiner* — William C Vaughn, Jr.
*Assistant Examiner* — Jerry T Jean Baptiste
(74) *Attorney, Agent, or Firm* — Christensen O'Connor Johnson Kindness PLLC

(57) ABSTRACT

A time of flight camera includes a light source, a first pixel, a time-to-digital converting, and a controller. The light source is configured to emit light towards an object to be reflected back to the time of flight camera as image light. The first pixel includes a photodetector to detect the image light and to convert the image light into an electric signal. The time-to-digital converter is configured to generate timing signals representative of when the light source emits the light and when the photodetector detects the image light. The controller is coupled to the light source, the first pixel, and the time-to-digital converter. The controller includes logic that when executed causes the time of flight camera to perform operations. The operations include determining a detection window for a round-trip time of the image light based, at least in part, on the timing signals and first pulses of the light. The operations also include determining the round-trip time based, at least in part, on the timing signals and second pulses of the light detected within the detection window.

24 Claims, 4 Drawing Sheets

(51) Int. Cl.
  G01S 17/89    (2020.01)
  H04N 5/369    (2011.01)
  G01S 7/4865   (2020.01)
  *G06T 7/521*      (2017.01)

(56) References Cited

U.S. PATENT DOCUMENTS

| | | | | |
|---|---|---|---|---|
| 2013/0062500 A1* | 3/2013 | Oh | ......... | G01S 7/4816 |
| | | | | 250/201.1 |
| 2014/0240692 A1* | 8/2014 | Tien | ......... | G01S 17/894 |
| | | | | 356/5.01 |
| 2015/0109414 A1* | 4/2015 | Adam | ......... | G01C 11/02 |
| | | | | 348/46 |
| 2015/0169961 A1* | 6/2015 | Ito | ......... | G06K 9/00711 |
| | | | | 382/103 |
| 2015/0293228 A1* | 10/2015 | Retterath | ......... | G01S 17/89 |
| | | | | 356/5.01 |
| 2017/0155225 A1* | 6/2017 | Villeneuve | ......... | G01S 7/4818 |

OTHER PUBLICATIONS

Niclass et al., "Design and Characterization of a CMOS 3-D Image Sensor Based on Single Photon Avalanche Diodes," IEEE Journal of Solid-State Circuits, vol. 40, No. 9, Sep. 2005, 8 pages.
Stoppa, David, "Single-Photon Avalanche Diode ToF Imagers," Feb. 3, 2017, PowerPoint presentation, 66 pages.
2016 IEEE International Solid-State Circuits Conference, Session 6 Overview: Image Sensors, Digest of Technical Papers, 29 pages.

* cited by examiner

TIME OF FLIGHT CAMERA WITH PHOTON CORRELATION SUCCESSIVE APPROXIMATION

TECHNICAL FIELD

This disclosure relates generally to image sensors. In particular, embodiments of the present invention are related to image sensors for three dimensional cameras.

BACKGROUND INFORMATION

Interest in three dimension (3D) cameras is increasing as the popularity of 3D applications continues to grow in areas such as imaging, movies, games, computers, user interfaces, facial recognition, object recognition, augmented reality, and the like. A typical passive way to create 3D images is to use multiple cameras to capture stereo or multiple images. Using the stereo images, objects in the images can be triangulated to create the 3D image. One disadvantage with this triangulation technique is that it is difficult to create 3D images using small devices because there must be a minimum separation distance between each camera in order to create the three dimensional images. In addition, this technique is complex and therefore requires significant computer processing power in order to create the 3D images in real time.

For applications that require the acquisition of 3D images in real time, active depth imaging systems based on time of flight measurements are sometimes utilized. Time of flight cameras typically employ a light source that directs light at an object, a sensor that detects the light that is reflected from the object, and a processing unit that calculates the distance to the objected based on the round-trip time it takes for the light to travel to and from the object.

A continuing challenge with the acquisition of 3D images is balancing the desired performance parameters of the time of flight camera with the physical size and power constraints of the system. For example, the power requirements of time of flight systems meant for imaging near and far objects may be considerably different. These challenges are further complicated by extrinsic parameters (e.g., desired frame rate of the camera, depth resolution and lateral resolution) and intrinsic parameters (e.g., quantum efficiency of the sensor, fill factor, jitter, and noise).

BRIEF DESCRIPTION OF THE DRAWINGS

Non-limiting and non-exhaustive examples of the invention are described with reference to the following figures, wherein like reference numerals refer to like parts throughout the various views unless otherwise specified.

Figure 1:
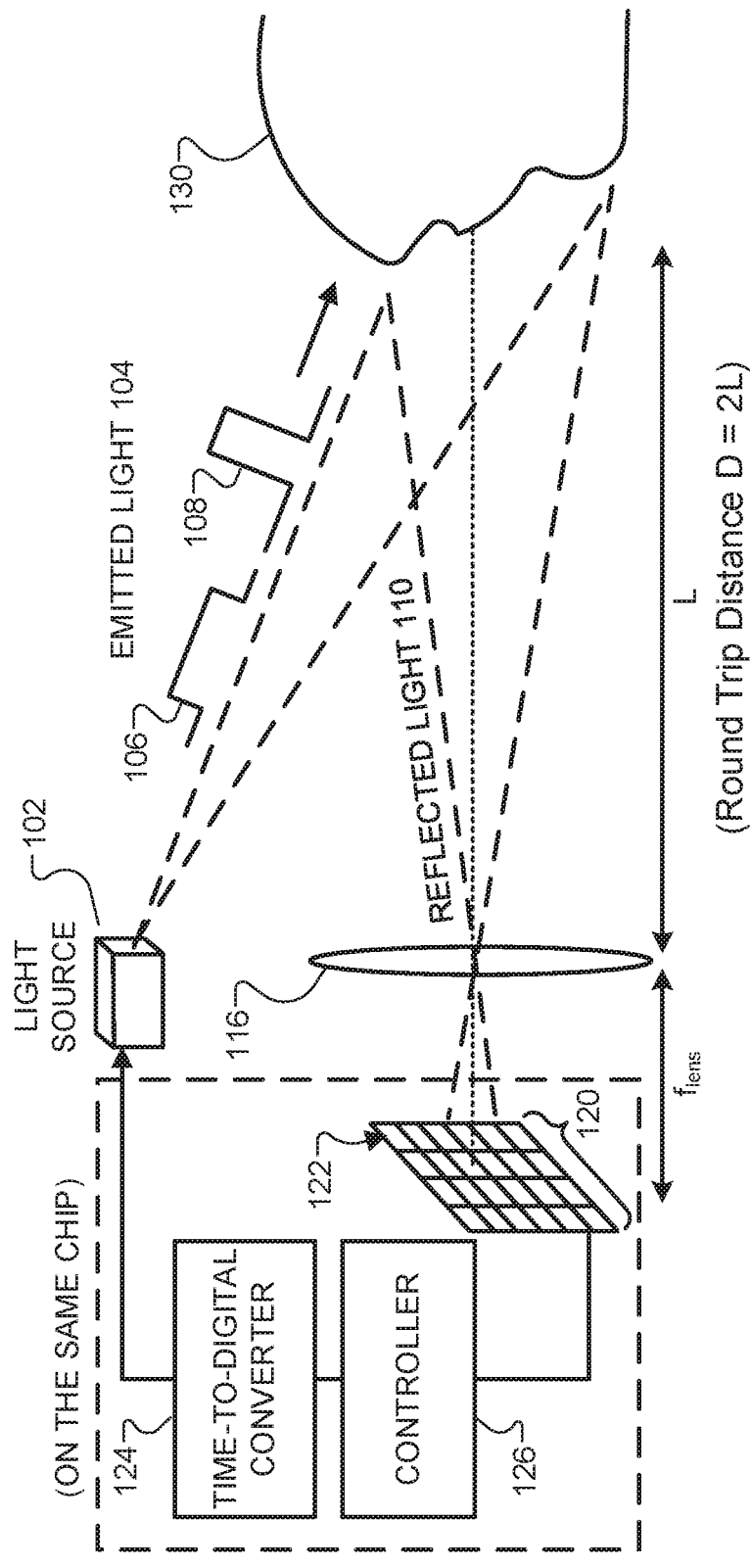
FIG. 1 is a block diagram that shows one example of a time of flight camera in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an apparatus and method for acquiring time of flight and depth information using a time of flight camera with photon correlation successive approximation are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

In some examples, a time of flight camera utilizes a photon correlation successive approximation technique to acquire time of flight and depth information. As will be discussed, photon correlation successive approximation may generally be described as a two-phase acquisition technique that provides successive coarse and then fine range acquisition for each pixel in the time of flight camera, in accordance with the teachings of the present invention. This may be achieved by a combination of photon correlation and time gating with the pixels of the time of flight camera and is based, at least in part, on a proposal that the same time of flight methodology may not need to be used for an entire frame. A first phase of the two-phase acquisition method may work as follows: for the first subframes in each frame (e.g., the first 100 subframes of 1000 subframes per 1 frame per second), light illumination uses longer pulses for coarse range and a pixel of four (or more) single-photon avalanche photodiodes (SPADs) accepts loose photon correlation in the time domain within this longer duration correlation window at lower peak vertical-cavity surface emitting laser (VCSEL)

current. Each pixel, of four or more SPADs, then converges on a coarse range estimate for the target. The longer VCSEL pulse sends out more photons at a lower peak current, but the disadvantage is reduced range accuracy.

Once a course range estimate has been acquired for each pixel, a second phase of the two-phase acquisition starts for the remaining subframes. The second phase may switch to a time-gated mode around the time defined from the first phase photon correlation result (e.g., a detection window). In one example, time-gating enables the SPADs to detect photons within only a short time window (e.g., the detection window), which ignores background photons that arrive outside of this time window. The second phase reverts to a shorter light pulse with higher VCSEL peak currents than the first phase, but is only in operation for a shorter portion of the subframe. The advantage of this over photon correlation is that all photons that are received by the SPADs during the second phase are counted by the detector (excluding dead time, fill factor, and quantum efficiency losses) and accumulated into a histogram so that no photons are rejected. This may mean that no signal is thrown away during fine acquisition because it is not correlated, which may be the case if a correlated photon requirement was used for the entire frame. In some examples, an advantage of the two-phase acquisition method that uses long pulses during the first phase and short pulses during the second phase is a lower sustained peak VCSEL laser current compared to using short pulses for the whole integration time with a large number of photons received by the time of flight camera. It is noted that the number of photons sent by the time of flight camera may be limited by eye-safety requirements. Thus one of the advantages of the examples described herein is a reduce amount of the signal from detected photons is wasted compared to a conventional device.

To illustrate, FIG. 1 is a block diagram that shows one example of a time of flight camera 100 in accordance with the teachings of the present invention. Time of flight camera 100 includes light source 102, lens 116, plurality of pixels 120 (including first pixel 122), time-to-digital converter 124, and controller 126. Controller 126 is coupled to light source 102, time-to-digital converter 124, and plurality of pixels 120 (including first pixel 122). Plurality of pixels 120 is positioned at a focal length $f_{lens}$ from lens 116. As shown in the example, light source 102 and lens 116 are positioned at a distance L from object 130. It is appreciated that FIG. 1 is not illustrated to scale and that in one example the focal length $f_{lens}$ is substantially less than the distance L between lens 116 and object 130. Therefore, it is appreciated that for the purposes of this disclosure, the distance L and the distance L+focal length $f_{lens}$ are substantially equal for the purposes of time of flight measurements in accordance with the teachings of the present invention. As illustrated, plurality of pixels 120, time-to-digital converter 124, and controller 126 are represented as separate components. However, it is appreciated that plurality of pixels 120, time-to-digital converter 124, and controller 126 may all be integrated onto a same stacked chip sensor. In other embodiments, plurality of pixels 120, time-to-digital converter 124, and controller 126 may be integrated onto a non-stacked standard planar sensor. Furthermore, it is appreciated that time-to-digital converter 124 may be a plurality of time-to-digital converters, with each pixel of four or more SPADs associated with a corresponding one of the plurality of time-to-digital converters 124. It is also appreciated, that in some examples, individual time-to-digital converters may be associated with any pre-determined number of SPADs and/or pixels. It is also appreciated that each pixel (or even each SPAD) may have a corresponding memory for storing digital bits or signals for counting detected photons.

Time of flight camera 100 is a 3D camera that calculates image depth information of a scene to be imaged (e.g., object 130) based on time of flight measurements with plurality of pixels 120. Each pixel in plurality of pixels 120 determines depth information for a corresponding portion of object 130 such that a 3D image of object 130 can be generated. Depth information is determined by measuring a round-trip time for light to propagate from light source 102 to object 130 and back to time of flight camera 100. As illustrated, light source 102 (e.g., a vertical-cavity surface-emitting laser) is configured to emit light 104 (e.g., first pulses 106 and second pulses 108) to object 130 over a distance L. Emitted light 104 is then reflected from object 130 as reflected light 110, some of which propagates towards time of flight camera 100 over a distance L and is incident upon plurality of pixels 120 as image light. Each pixel (e.g., first pixel 122) in plurality of pixels 120 includes a photodetector (e.g., one or more single-photon avalanche diodes) to detect the image light and convert the image light into an electric signal (e.g., image charge).

As shown in the depicted example, the round-trip time for pulses (e.g., first pulses 106 and second pulses 108) of the emitted light 104 to propagate from light source 102 to object 130 and back to plurality of pixels 120 can be used to determine the distance L using the following relationships in Equations (1) and (2) below:

$$T_{TOF} = \frac{2L}{c} \quad (1)$$

$$L = \frac{T_{TOF} \times c}{2} \quad (2)$$

where c is the speed of light, which is approximately equal to $3 \times 10^8$ m/s, and $T_{TOF}$ corresponds to the round-trip time which is the amount of time that it takes for pulses of the light to travel to and from the object as shown in FIG. 1. Accordingly, once the round-trip time is known, the distance L may be calculated and subsequently used to determine depth information of object 130.

Controller 126 is coupled to plurality of pixels 120 (including first pixel 122), time-to-digital converter 124, and light source 102 and includes logic that when executed causes time of flight camera 100 to perform operations for determining the round-trip time. Determining the round-trip time may be based on, at least in part, timing signals generated by time-to-digital converter 124. The timing signals are representative of when light source 102 emits light and when the photodetector detects the image light.

In some examples, time of flight camera 100 is included in a handheld device (e.g., a mobile phone, a tablet, a camera, etc.) that has size and power constraints determined, at least in part, based on the size of the device. Alternatively, or in addition, time of flight camera 100 may have specific desired device parameters such as frame rate, depth resolution, lateral resolution, etc.

In one example, it may be desirable for time of flight camera 100 to generate a video that includes depth information of object 130 in every frame at a frame rate of 60 frames per second. In other words, time of flight camera 100 captures a 3D image containing depth information 60 times per second. Each frame may contain a plurality of subframes (e.g., between 2 and 1000 subframes, or more, per 1 frame, such as 1000 subframes) during which light source 102 may emit light pulses (e.g., first pulses 106 and second pulses 108) and the photodetector (e.g., the photodetector included in first pixel 122) may detect image light for determining the round-trip time for light between time of flight camera 100 and object 130 in order to generate the 3D image. In other examples, the number of the plurality of subframes may be 100,000 or more subframes.

Figure 2A:
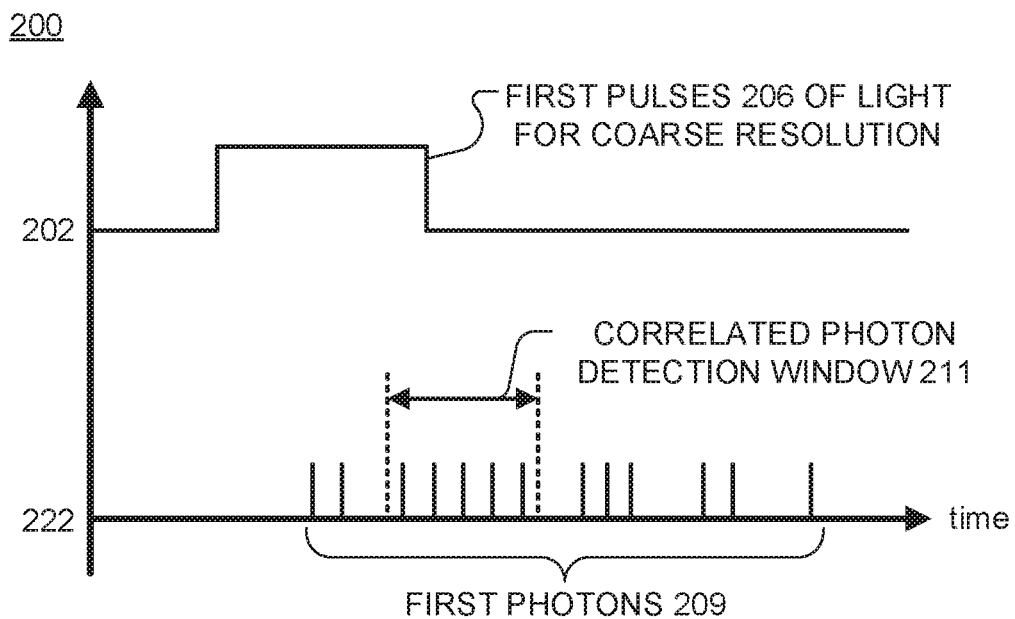
FIG. 2A is a timing diagram that shows an example of emitting first pulses of light to an object and detecting first photons reflected from the object to determine a detection window for a first pixel that may be included in the time of flight camera of FIG. 1 in accordance with the teachings of the present invention.
Figure 2B:
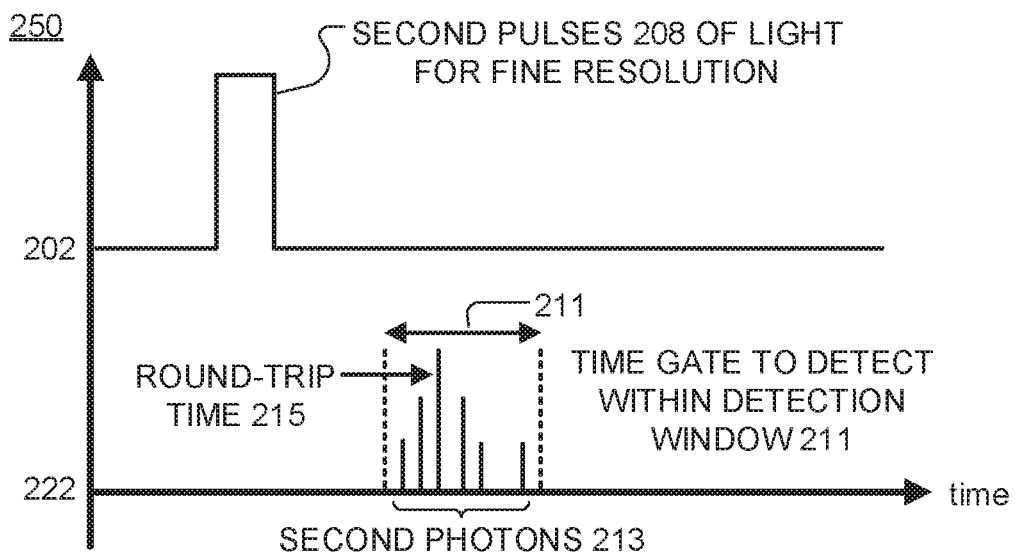
FIG. 2B is a timing diagram that shows an example of emitting second pulses of light and detecting second photons reflected from the object within the detection window to determine a round-trip time from the first pixel that may be included in the time of flight camera of FIG. 1 and the object in accordance with the teachings of the present invention.

In some examples, time of flight camera 100 may utilize a two-phase acquisition method to meet desired device parameters and/or due to size and power constraints of the system. FIG. 2A and FIG. 2B illustrate, at least in part, a first phase and a second phase of the two-phase acquisition method, respectively. More specifically, FIG. 2A and FIG. 2B each illustrate an example timing diagram of a subframe included in the plurality of subframes for a first pixel that may be included in time of flight camera 100 of FIG. 1 in accordance with the teachings of the present invention. The timing diagrams illustrate an output (e.g., first pulses 206 for timing diagram 200 of FIG. 2A and second pulses 208 for timing diagram 250 of FIG. 2B) of light source 202 with the x-axis corresponding to time and the y-axis corresponding to current or light intensity. It is noted that the initial state of light source 202 is in the off or null state. Timing diagrams 200 and 250 also illustrate detecting photons (e.g., first photons 209 for timing diagram 200 and second photons 213 for timing diagram 250) with photodetector 222 included in the first pixel. The x-axis corresponds to time and the y-axis may correspond to counts, number of photons detected, voltage reading of a capacitor, number of digital bits in a memory element, and the like.

FIG. 2A illustrates timing diagram 200, which is an example of a first subframe included in a plurality of first subframes. The plurality of first subframes is included in the first phase of the two-phase acquisition method and is utilized for determining detection window 211 for the round-trip time of the image light. For each of the plurality of first subframes, the first phase includes emitting a series of first pulses 206 of light with light source 202 for coarse (relative to the second phase) resolution of lateral depth. In response to emitting first pulses 206, photodetector 222 is then utilized for detecting photons (e.g., first photons 209) of the image light reflected from the object. First photons 209 correspond to the photons detected during the first phase. While emitting first pulses 206 during the plurality of first subframes, photons (e.g., first photons 209 and background photons) received by the plurality of pixels (including the first pixel) are detected. Digital logic then opens a correlation time window upon the detection of each of the photons for a same duration as each of first pulses 206. A counter is then started, and if the counter reaches a number greater than the correlation threshold (e.g., the number of SPADs per pixel, which in the illustrated embodiment is 5 SPADs per pixel), then these detected photons are considered correlated photons and indicate with coarse accuracy the distance to the target. As illustrated, the detected photons (e.g., first photons 209) are represented by the vertical lines on the axis for photodetector 222. Each vertical line represents a photon arrival to one of the pixels of photodetector 222. The reflectance of the target or object is indicated by an increased density in vertical lines (e.g., pulse density modulation signals). After m (e.g., 100) first subframes, the detected first photons 209 converge to within a first timespan when the correlation threshold is met and may be utilized to calculate detection window 211. Detection window 211 is a coarse approximation of the round-trip time based, at least in part, on the first timespan, which is the time between emitting one of the first pulses 206 and detecting the first photons 209 having a number of photons within the correlation threshold. In one example, detection window 211 is calculated from the average first timespan of each of the plurality of first subframes, plus or minus a standard of deviation. The first timespan may be determined, at least in part, from timing signals generated by a time-to-digital converter (e.g., time-to-digital converter 124 illustrated in FIG. 1). It is appreciated, during the first phase of this acquisition method, the correlation threshold may determine whether detected photons are rejected. For example, if a correlation threshold is set as four photons and only three photons are detected, then these three photons are not used (e.g., wasted) in determining the first timespan.

FIG. 2B illustrates timing diagram 250, which is an example of a second subframe included in a plurality of second subframes. The plurality of second subframes is included in the second phase of the two-phase acquisition method and is utilized for determining the round-trip time based, at least in part, on second pulses 208. For each of the plurality of second subframes, the second phase includes emitting a series of second pulses 208 of light with light source 202 for fine (relative to the coarse resolution of the first phase) resolution of lateral depth. In response to emitting second pulses 208, photodetector 222 is then utilized for detecting second photons 213 of the image light reflected from the object within detection window 211. For each second subframe included in the plurality of second subframes, one of the second pulses 208 is emitted and a corresponding one of the second photons 213 is detected within detection window 211. In other words, during the second phase of the two-phase acquisition method, photodetector 222 is configured to only sense light within the time frame of detection window 211 after each of the second pulses 208. In one example, photodetector 222 is enabled within detection window 211 during each of the second subframes for detecting second photons 213 within detection window 211, and photodetector 222 is disabled outside of detection window 211 during each of the second subframes to reduce background noise when detecting second photons 213. Disabling photodetector 222 may prevent false detection of second photons 213 outside of detection window 211 that may occur due to ambient light, jitter, noise, etc. In some examples, disabling photodetector 222 and enabling photodetector 222 is achieved via time-gating. For example, if photodetector 222 is a SPAD, the SPAD may be gated to be reverse biased at specific times such that the SPAD detects photons only within photon detection window 211 during the second phase of the two-phase acquisition method. An advantage of the second phase is all photons that are received by the photodetector (e.g., SPADs) are counted by the detector (excluding dead time and fill factor) so that none of the second photons 213 are rejected that are not correlated events. This may mean that no signal is wasted during the fine acquisition because it is not correlated, which would be the case if a correlated photon requirement was used for the entire subframe.

After n (e.g., 900) second subframes, the second photons 213 detected within detection window 211 can be used to shrink the range of detection window 211 to converge on round-trip time 215. As illustrated, round-trip time 215 may be calculated based on a second timespan between emitting second pulses 208 and detecting the corresponding one of the second photons 213 for each of the plurality of second subframes. The second timespan may be determined, at least in part, from timing signals generated by a time-to-digital converter (e.g., time-to-digital converter 124 illustrated in FIG. 1) and accumulated into a histogram of second photons 213 in FIG. 2B. The round trip time 215 may then be determined by histogram analysis algorithm, such as peak detection.

Referring to both FIG. 2A and FIG. 2B, it is important to note that the lateral depth resolution for determining the round-trip is based, at least in part, on the respective duration of each of the individual first pulses 206 and the individual second pulses 208. As illustrated, a first pulse duration of each of the first pulses 206 is greater than a second pulse duration of each of the second pulses 208. Thus, the lateral depth resolution of first pulses 206 is less than the lateral depth resolution of second pulses 208. This indicated by equations (1) and (2). For example, each of the first pulses 206 may have a 3 ns duration and each of the second pulses 208 may have a 1 ns duration which would correspond to a depth resolution of 45 cm and 15 cm respectively without factoring in error from jitter, noise, and the like. Thus, the first phase utilizes first pulses 206 to determine detection window 211, which is a coarse approximation of the round-trip time based on a lower lateral depth resolution (relative to the fine approximation of the second phase). Detection window 211 may also be called a correlated photon detection window because each detection event detects a single photon and occurs based on time correlation with a corresponding pulse of light. After determining detection window 211, second pulses 208, which have a shorter duration but larger intensity relative to first pulses 206, are utilized to determine round-trip time 215 within a pre-determined margin of error. In one example, the second pulses are 1 ns in duration which result in a depth resolution of 15 cm without factoring error from jitter, noise, and the like. In other examples, the second pulses are substantially less than 1 ns in duration. It is further appreciated that the proposed durations of first pulses 206 and second pulses 208 are merely examples, and that other durations may also be utilized dependent on various factors such as desired accuracy and/or resolution, system limitations, and safety concerns.

FIG. 2A and FIG. 2B also indicate relative light intensity of first pulses 206 and second pulses 208. It is noted that in the illustrated example, a first light intensity of each of the first pulses 206 is less than a second light intensity of each of the second pulses 208. The longer first pulses 206 send out more photons at a lower peak current (lower intensity) relative to the shorter second pulses 208, which may reduce the total power consumption of the time of flight camera when using the two-phase acquisition method, in accordance with the teachings of the present invention. This is advantageous because mobile phone type applications have a limited ability to sustain high peak currents for long periods of time.

In some examples, photodetector 222 includes a single-photon avalanche photodiode (SPAD). In another example, photodetector 222 includes an array of 4 (or more) SPADs for detecting first photons 209 and second photons 213. A 4 SPAD array for detector 222 may enable resolution recovery. Resolution recovery may be enabled by utilizing the 4 SPAD array for detecting first photons 209 during the first phase and a single SPAD for detecting second photons 213 during the second phase. However, this example architecture may be susceptible to edge detection errors and as such may implement an algorithm for error correction.

In response to determining the round-trip time for light to travel between the first pixel and the object, the time of flight camera may further calculate the distance between the first pixel and the object, as indicated by equations (1) and (2). In some examples, the first pixel is one of a plurality of pixels included in the time of flight camera. The round-trip time may be determined for each of the plurality of pixels and the time of flight camera may calculate a round-trip distance between each of the plurality of pixels and a corresponding portion of the object based on the determined round-trip time to generate a 3D image or video with depth information of the object from the image light.

Figure 3:
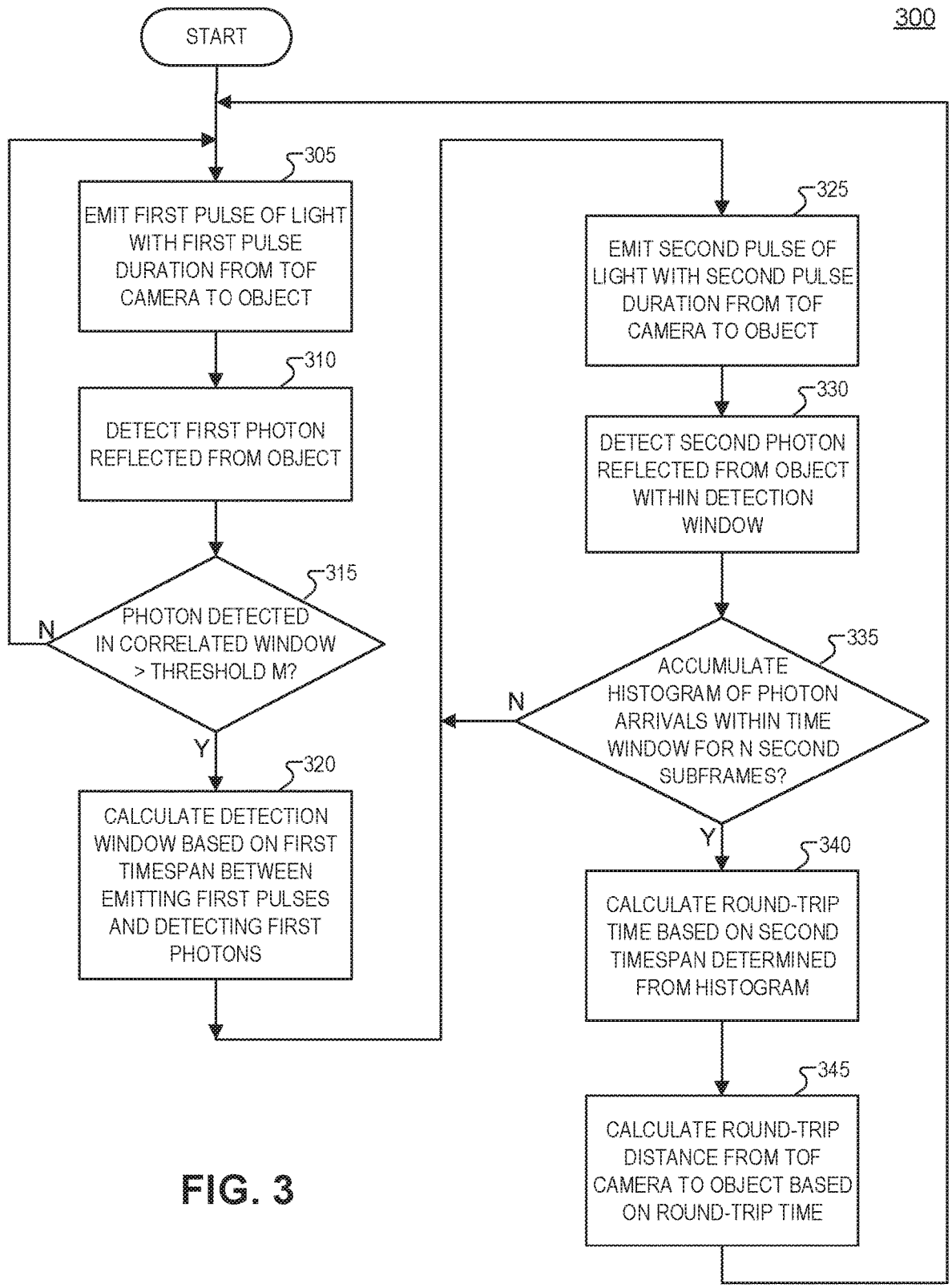
FIG. 3 illustrates an example flow diagram that shows a method for calculating a round-trip distance from a time of flight camera and an object in accordance with the teachings of the present invention.

FIG. 3 illustrates an example flow diagram that shows method 300 for calculating a round-trip distance from a time of flight camera and an object in accordance with the teachings of the present invention. Method 300 utilizes the two-phase acquisition technique in accordance with the teachings of the present invention.

Blocks 305-320 show the steps for determining a detection window for a round-trip time of image light from a time of flight camera to an object and back to the time of flight camera. Determining the detection window is based, at least in part, on detecting, with a photodetector included in a first pixel of the time of flight camera, first pulses of light from a light source included in the time of flight camera, in accordance with the teachings of the present invention. In one example, the light source is a vertical-cavity surface emitting laser. In the same or other examples, the photodetector is one or more single-photon avalanche photodiodes (SPADs), such as an array of four SPADs.

Blocks 325-345 illustrate determining the round-trip time based, at least in part, on second pulses of light from the light source that are detected within the detection window in accordance with the teachings of the present invention.

Block 305 shows emitting first pulses of light with the light source to the object.

Block 310 illustrates detecting, with a photodetector included in the time of flight camera, first photons reflected from the object in response to emitting the first pulses. The first photons are based on a correlation threshold number of photons detected within a first timespan to calculate the detection window.

Block 315 shows the process of detecting greater than threshold m first photons within the correlated window.

Block 320 illustrates calculating the detection window based on the first photons detected within the first timespan.

Block 325 shows emitting the second pulses of the light with the light source to the object. In one example, a first pulse duration of each of the first pulses is greater than a second pulse duration of each of the second pulses. In the same or another example, a first light intensity of each of the first pulses is less than a second light intensity of each of the second pulses.

Block 330 illustrates detecting, within the detection window with the photodetector, second photons reflected from the object in response to emitting the second pulses. The second photons are detected within the detection window to generate a histogram representing the second photons detected at various times within the detection window. The second photons in the histogram converge to a second timespan. Detecting the second photons within the detection window may be achieved by enabling the photodetector within the detection window during each of the second subframes. The photodetector may also be disabled outside of the detection window during each of the second subframes to reduce background noise when detecting the second photons. In some examples, enabling and disabling the photodetector during the second subframes may be achieved via time-gating.

Block 335 shows that the process of accumulating a histogram of photon arrivals (e.g. the second photons) within the time window for n second subframes. The second photons within the histogram converge to a second timespan for calculating the round-trip time.

Block 340 illustrates calculating the round-trip time based on the second timespan by analyzing the histogram. In one example, the first photons and the second photons are included in image light. The time of flight camera may also include a time-to-digital converter (TDC) in each pixel (e.g. group of/SPADs) for generating timing signals representative for when the light source emits the light and when the photodetector detects the image light. Furthermore, the first time span and the second time span may be based, at least in part, on the timing signals generated by the TDC.

Block 345 shows calculating a round-trip distance between the first pixel included in the time of flight camera and the object in response to determining the round-trip time.

Figure 4:
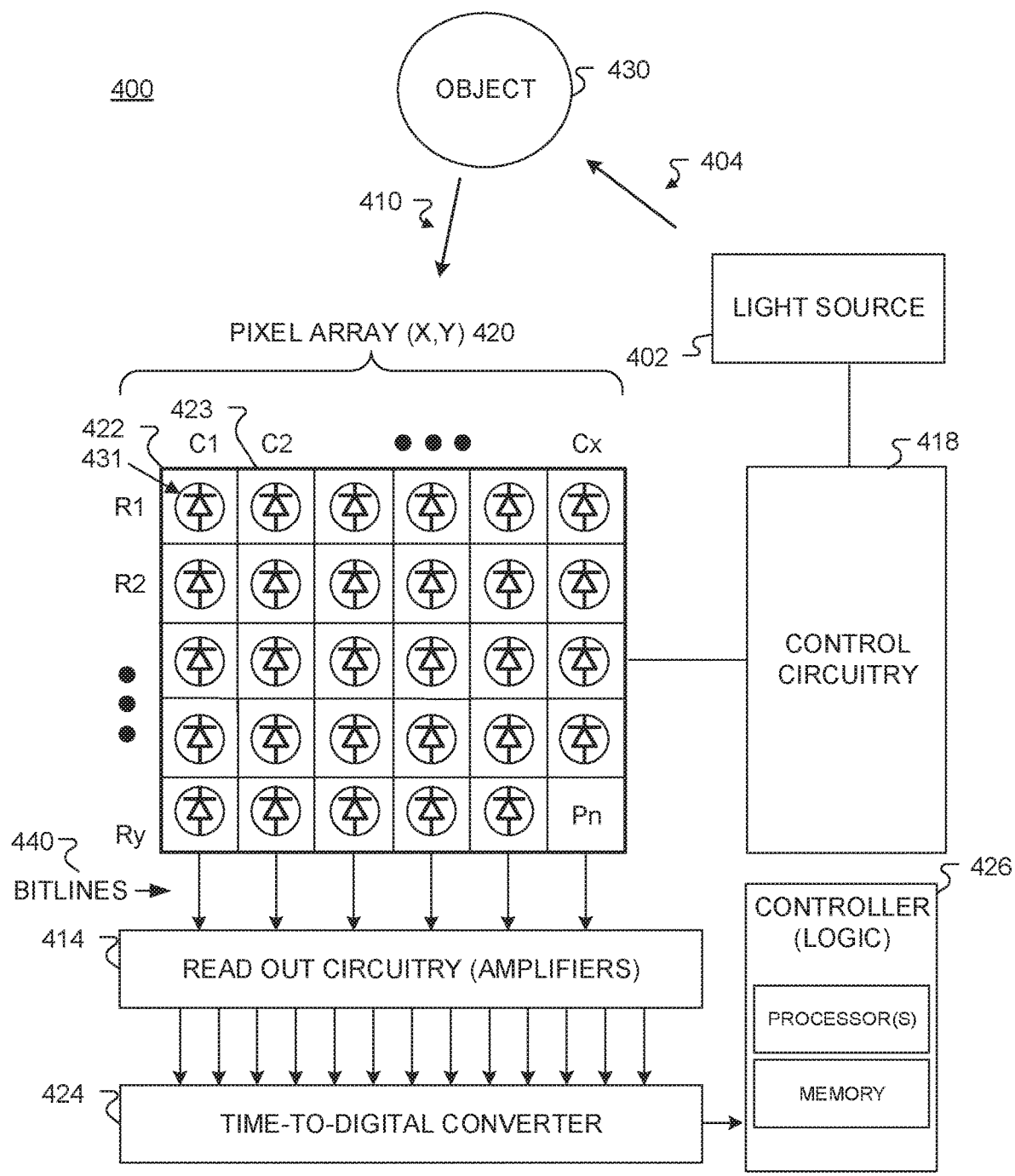
FIG. 4 is a block diagram that shows a portion of an example time of flight camera including a time of flight pixel array with corresponding single-photon avalanche photodiodes, read out circuitry, time-to-digital converter, control circuitry, and a controller with logic in accordance with the teachings of the present disclosure.

FIG. 4 is a block diagram that shows a portion of an example time of flight camera 400 including time of flight pixel array 420 including first pixel 422 with corresponding single-photon avalanche photodiode 431, read out circuitry 414, time-to-digital converter 424, control circuitry 418, and a controller 426 with logic in accordance with the teachings of the present disclosure. It is noted that time of flight camera 400 may be implemented in a stacked chip scheme. For instance, as shown in the example, pixel array 420 may be included in a pixel die, while readout circuitry 414, time-to-digital converter 424, controller (logic that may include one or more processor and memory) 426, and control circuitry 418, as illustrated in FIG. 4, may be included in a separate application specific integrated circuit (ASIC) die in accordance with the teachings of the present invention. In the example, the pixel die and ASIC die are stacked and coupled together during fabrication to implement a time of flight camera in accordance with the teachings of the present invention. In other embodiments, a non-stacked implementation of time of flight camera 400 may be utilized. For example, the pixel die (including pixel array 420), readout circuitry 414, time-to-digital converter 424, controller 426, and control circuitry 418 may be fabricated on the same Si substrate. In general, it is appreciated that time of flight camera 400 may be implemented in both stacked and non-stack solutions.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A time of flight (ToF) camera, comprising:
a light source to emit light towards an object to be reflected back to the ToF camera as image light;
a first pixel to convert the image light into an electric signal, wherein the first pixel includes a photodetector to detect the image light;
a time-to-digital converter (TDC) to generate timing signals representative of when the light source emits the light and when the photodetector detects the image light; and
a controller coupled to the light source, the first pixel, and the TDC, wherein the controller includes logic that when executed causes the ToF camera to perform operations including:
determining a detection window for when to detect the image light based, at least in part, on the timing signals and first pulses of the light; and
determining a round trip time (RTT) of the image light based, at least in part, on the timing signals and second pulses of the light detected within the detection window, wherein a first pulse duration of each of the first pulses is greater than a second pulse duration of each of the second pulses.

2. The ToF camera of claim 1, wherein the controller includes further logic that when executed causes the ToF camera to perform further operations including:
calculating a distance between the first pixel and the object in response to determining the RTT.

3. The ToF camera of claim 1, wherein the controller includes further logic that when executed causes the ToF camera to perform further operations including:
emitting the first pulses of the light with the light source to the object;
detecting first photons of the image light reflected from the object in response to emitting the first pulses, wherein the first photons are based on a correlation threshold number of photons detected within a first timespan to calculate the detection window; and
calculating the detection window based on the first photons detected within the first timespan, wherein the first timespan is determined, at least in part, from the timing signals generated by the TDC.

4. The ToF camera of claim 3, wherein the controller includes further logic that when executed causes the ToF camera to perform further operations including:
emitting the second pulses of the light with the light source to the object;
in response to emitting the second pulses, detecting second photons within the detection window to generate a histogram representing the second photons detected at various times within the detection window, wherein the second photons in the histogram converge to a second timespan; and
calculating the RTT based on the second timespan by analyzing the histogram, wherein the second timespan is determined, at least in part, from the timing signals generated by the TDC.

5. The ToF camera of claim 4, wherein the ToF camera has a frame rate of at least 60 frames per second, wherein the operations are performed during each of the frames such that subframes of each of the frames includes a plurality of first subframes and a plurality of second subframes.

6. The ToF camera of claim 5, wherein a total number of the subframes in each of the frames is at least 100,000 subframes.

7. The ToF camera of claim 5, wherein the controller includes further logic that when executed causes the ToF camera to perform further operations including:
enabling the photodetector within the detection window during the plurality of second subframes for detecting the second photons within the detection window to determine the RTT; and disabling the photodetector outside of the detection window during the plurality of second subframes to reduce background noise when detecting the second photons.

8. The ToF camera of claim 4, wherein enabling the photodetector and disabling the photodetector is achieved via time-gating.

9. The ToF camera of claim 3, wherein a first light intensity of each of the first pulses is less than a second light intensity of each of the second pulses.

10. The ToF camera of claim 1, wherein the light source is a vertical-cavity surface-emitting laser.

11. The ToF camera of claim 1, wherein the photodetector of the first pixel is one or more single-photon avalanche photodiodes (SPADs).

12. The ToF camera of claim 11, wherein the photodetector of the first pixel includes an array of four SPADs.

13. The ToF camera of claim 1, wherein the first pixel is one of a plurality of pixels included in the ToF camera, wherein the RTT is determined for each of the plurality of pixels, and wherein the controller includes further logic that when executed causes the ToF camera to perform further operations including:
calculating a round-trip distance between each of the plurality of pixels and a corresponding portion of the object based on the determined RTT to generate depth information of the object from the image light.

14. A method for calculating a time of flight (ToF), the method comprising:
determining a detection window for when to detect image light from a ToF camera to an object and back to the ToF camera, wherein determining the detection window is based, at least in part, on first pulses of light from a light source included in the ToF camera; and
determining a round trip time (RTT) of the image light based, at least in part, on second pulses of the light from the light source detected within the detection window, wherein a first pulse duration of each of the first pulses is greater than a second pulse duration of each of the second pulses.

15. The method of claim 14, wherein a first light intensity of each of the first pulses is less than a second light intensity of each of the second pulses.

16. The method of claim 14, further comprising:
calculating a distance between a first pixel included in the ToF camera and the object in response to determining the RTT.

17. The method of claim 14, wherein determining the detection window includes:
emitting the first pulses of the light with the light source to the object;
detecting, with a photodetector included in the ToF camera, first photons reflected from the object in response to emitting the first pulses, wherein the first photons are based on a correlation threshold number of photons detected within a first timespan to calculate the detection window; and
calculating the detection window based on the first photons detected within the first timespan.

18. The method of claim 17, wherein determining the RTT includes:
emitting the second pulses of the light with the light source to the object;
detecting, within the detection window with the photodetector, second photons reflected from the object in response to emitting the second pulses, wherein the second photons are detected within the detection window to generate a histogram representing the second photons detected at various times within the detection window, wherein the second photons in the histogram converge to a second timespan; and
calculating the RTT based on the second timespan by analyzing the histogram.

19. The method of claim 18, wherein the first photons and the second photons are included in the image light, wherein the ToF camera includes a time-to-digital converter (TDC) for generating timing signals representative of when the light source emits the light and when the photodetector detects the image light, and wherein the first timespan and the second timespan are based, at least in part, on the timing signals generated by the TDC.

20. The method of claim 18, wherein determining the RTT further includes:
enabling the photodetector within the detection window during the second subframes for detecting the second photons within the detection window; and
disabling the photodetector outside of the detection window during the second subframes to reduce background noise when detecting the second photons.

21. The method of claim 20, wherein enabling the photodetector and disabling the photodetector is achieved via time-gating.

22. The method of claim 18, wherein the photodetector is one or more single-photon avalanche photodiodes (SPADs).

23. The method of claim 22, wherein the photodetector includes an array of four SPADs.

24. The method of claim 14, wherein the light source is a vertical-cavity surface-emitting laser.

\* \* \* \* \*